(12) United States Patent  
Maziel

(10) Patent No.: US 11,598,958 B2
(45) Date of Patent: Mar. 7, 2023

(54) METHOD OF FABRICATING A SYMMETRIC LIGHT GUIDE OPTICAL ELEMENT

(71) Applicant: Lumus Ltd., Ness Ziona (IL)

(72) Inventor: Amit Maziel, Rehovot (IL)

(73) Assignee: LUMUS LTD., Ness Ziona (IL)

( * ) Notice: Subject to any disclaimer, the term of this patent is extended or adjusted under 35 U.S.C. 154(b) by 158 days.

(21) Appl. No.: 17/416,492

(22) PCT Filed: Jan. 15, 2020

(86) PCT No.: PCT/IB2020/050294
§ 371 (c)(1),
(2) Date: Jun. 20, 2021

(87) PCT Pub. No.: WO2020/148665
PCT Pub. Date: Jul. 23, 2020

(65) Prior Publication Data
US 2022/0043269 A1      Feb. 10, 2022

Related U.S. Application Data

(60) Provisional application No. 62/792,433, filed on Jan. 15, 2019.

(51) Int. Cl.
*G02B 27/01* (2006.01)
*G02B 6/13* (2006.01)
(Continued)

(52) U.S. Cl.
CPC .............. *G02B 27/01* (2013.01); *G02B 6/13* (2013.01); *G02B 27/0081* (2013.01);
(Continued)

(58) Field of Classification Search
None
See application file for complete search history.

(56) References Cited

U.S. PATENT DOCUMENTS

| 4,017,158 A | 4/1977 | Booth |
| 5,005,320 A | 4/1991 | Furmanak |
| (Continued) | | |

FOREIGN PATENT DOCUMENTS

| CN | 1559000 A | 12/2004 |
| CN | 1650215 A | 8/2005 |
| (Continued) | | |

*Primary Examiner* — Darryl J Collins
*Assistant Examiner* — Tamara Y. Washington
(74) *Attorney, Agent, or Firm* — Mark M. Friedman

(57) ABSTRACT

A symmetric light guide optical element ("LOE") and methods of fabrication thereof are disclosed. The method includes providing a plurality of transparent plates, each plate having two parallel surfaces, stacking a first subset of the plurality of plates on a transparent base block to form a first stack of plates, forming a sloped surface on one side of the first stack plates and the base block, stacking a second subset of the plurality of plates on the sloped surface to form a second stack of plates, and extracting a slice of the first stack, the base block, and the second stack, such that the slice includes at least a part of the base block interposed between plates of the first stack and plates of the second stack.

6 Claims, 5 Drawing Sheets

(51) Int. Cl.
*G02B 27/00* (2006.01)
*G02B 27/28* (2006.01)

(52) U.S. Cl.
CPC ........ *G02B 27/285* (2013.01); *G02B 27/0172* (2013.01); *G02B 2027/0118* (2013.01)

(56) References Cited

U.S. PATENT DOCUMENTS

| | | | |
|---|---|---|---|
| 5,136,426 A | 8/1992 | Linden et al. | |
| 5,784,656 A | 7/1998 | Utagawa | |
| 5,818,618 A | 10/1998 | Eastmond | |
| 5,854,697 A | 12/1998 | Caulfield et al. | |
| 5,882,773 A | 3/1999 | Chow et al. | |
| 6,404,550 B1 | 6/2002 | Yajima | |
| 6,542,307 B2 | 4/2003 | Gleckman et al. | |
| 6,882,452 B2 | 4/2005 | Decker et al. | |
| 7,162,136 B1 | 1/2007 | Pertl et al. | |
| 7,245,408 B1 | 7/2007 | Huang et al. | |
| 7,418,170 B2 | 8/2008 | Mukawa et al. | |
| 7,502,168 B2 | 3/2009 | Akutsu et al. | |
| 7,643,214 B2 | 1/2010 | Amitai | |
| 7,764,413 B2 | 7/2010 | Levola | |
| 8,160,411 B2 | 4/2012 | Levola et al. | |
| 8,233,204 B1 | 7/2012 | Robbins et al. | |
| 8,333,476 B2 | 12/2012 | Ushigome et al. | |
| 8,446,675 B1 | 5/2013 | Wang et al. | |
| 8,665,178 B1 | 3/2014 | Wang | |
| 8,903,207 B1 | 12/2014 | Brown et al. | |
| 9,075,184 B2 | 7/2015 | Popovich et al. | |
| 9,207,461 B2 | 12/2015 | Frankel et al. | |
| 9,341,846 B2 | 5/2016 | Popovich et al. | |
| 9,349,165 B2 | 5/2016 | Cho et al. | |
| 9,456,744 B2 | 10/2016 | Popovich et al. | |
| 9,581,762 B2 | 2/2017 | Wertsberger et al. | |
| 9,791,696 B2 | 10/2017 | Woltman et al. | |
| 9,880,383 B2 | 1/2018 | Miyazaki et al. | |
| 9,891,363 B2 | 2/2018 | Ayres et al. | |
| 9,946,076 B2 | 4/2018 | Smits et al. | |
| 10,317,679 B2 | 6/2019 | Ayres et al. | |
| 10,330,937 B2 | 6/2019 | Cheng et al. | |
| 10,338,400 B2 | 7/2019 | Connor | |
| 10,345,519 B1 | 7/2019 | Miller | |
| 10,422,995 B2 | 9/2019 | Haddick | |
| 10,444,419 B2 | 10/2019 | Bhargava et al. | |
| 10,444,510 B1 | 10/2019 | Lee et al. | |
| 2002/0093701 A1 | 7/2002 | Zhang et al. | |
| 2002/0191394 A1 | 12/2002 | Coleman et al. | |
| 2003/0090753 A1 | 5/2003 | Takeyama et al. | |
| 2003/0179364 A1 | 9/2003 | Steenblik et al. | |
| 2004/0062502 A1 | 4/2004 | Levola | |
| 2005/0180687 A1 | 8/2005 | Amitai | |
| 2006/0126179 A1 | 6/2006 | Levola | |
| 2008/0309998 A1 | 12/2008 | Nakamura | |
| 2009/0034069 A1 | 2/2009 | Hsu | |
| 2009/0285528 A1 | 11/2009 | Chang et al. | |
| 2011/0026128 A1 | 2/2011 | Baker et al. | |
| 2013/0038935 A1 | 2/2013 | Moussa et al. | |
| 2013/0250430 A1 | 9/2013 | Robbins et al. | |
| 2013/0322813 A1 | 12/2013 | Grondin et al. | |
| 2014/0104665 A1 | 4/2014 | Popovich et al. | |
| 2014/0131586 A1 | 5/2014 | Wang et al. | |
| 2014/0140654 A1 | 5/2014 | Brown et al. | |
| 2014/0218801 A1 | 8/2014 | Simmonds et al. | |
| 2015/0077312 A1 | 3/2015 | Wang | |
| 2015/0109678 A1 | 4/2015 | Mukawa | |
| 2015/0205126 A1 | 7/2015 | Schowengerdt | |
| 2015/0255946 A1 | 9/2015 | Kitamura | |
| 2016/0104996 A1 | 1/2016 | Klennert | |
| 2016/0109713 A1 | 4/2016 | Osterhout | |
| 2016/0154150 A1 | 6/2016 | Simmonds et al. | |
| 2017/0031160 A1 | 2/2017 | Popovich et al. | |
| 2017/0059759 A1 | 3/2017 | Ayres | |
| 2017/0276940 A1 | 9/2017 | Popovich et al. | |
| 2017/0363799 A1 | 12/2017 | Ofir et al. | |
| 2018/0059306 A1 | 3/2018 | Pan | |
| 2018/0210202 A1 | 7/2018 | Danziger et al. | |
| 2018/0292599 A1 | 10/2018 | Ofir et al. | |
| 2019/0129168 A1 | 5/2019 | Tan | |
| 2019/0250405 A1* | 8/2019 | Leighton | G02B 6/0035 |
| 2020/0209667 A1 | 7/2020 | Sharlin et al. | |
| 2021/0033774 A1 | 2/2021 | Tanaka | |
| 2021/0101245 A1 | 4/2021 | Han et al. | |
| 2022/0155629 A1 | 5/2022 | Sharlin et al. | |

FOREIGN PATENT DOCUMENTS

| | | |
|---|---|---|
| CN | 1813213 A | 8/2006 |
| CN | 101730859 A | 6/2010 |
| CN | 104350411 A | 2/2015 |
| CN | 104737061 A | 6/2015 |
| CN | 106556929 A | 4/2017 |
| CN | 107290816 A | 10/2017 |
| CN | 107329273 A | 11/2017 |
| CN | 107643559 A | 1/2018 |
| CN | 107728253 A | 2/2018 |
| CN | 107918209 A | 4/2018 |
| CN | 107966820 A | 4/2018 |
| CN | 207424391 U | 5/2018 |
| CN | 108139587 A | 6/2018 |
| CN | 108235739 A | 6/2018 |
| GN | 107193078 A | 9/2017 |
| JP | 2015121647 | 12/2013 |
| WO | 2015001839 A1 | 1/2015 |
| WO | 2015006784 A2 | 1/2015 |
| WO | 2021105982 | 6/2021 |
| WO | 2021124315 | 6/2021 |
| WO | 2021152602 | 8/2021 |
| WO | 202191389 | 9/2021 |
| WO | 2021191889 | 9/2021 |

\* cited by examiner

PRIOR ART

METHOD OF FABRICATING A SYMMETRIC LIGHT GUIDE OPTICAL ELEMENT

TECHNICAL FIELD

The presently disclosed subject matter relates to methods of fabricating a symmetric light guide optical element (LOE) and, more particularly, to a symmetric LOE without a bonding interface.

BACKGROUND

One of the important applications for compact optical elements is with head-mounted displays (HMD), in which an optical module serves as both an imaging lens and a combiner, whereby a two dimensional display is imaged to infinity and reflected into the eye of an observer. The display can be obtained directly from either a spatial light modulator (SLM) such as a cathode ray tube (CRT), a liquid crystal display (LCD), an organic light emitting diode array (OLED), a scanning source or similar devices, or indirectly, by means of a relay lens or an optical fiber bundle. The display comprises an array of elements (pixels) imaged to infinity by a collimating lens and transmitted into the eye of the viewer by means of a reflecting, or partially reflecting, surface acting as a combiner for non-see through or see-through applications, respectively. Typically, a conventional, free-space optical module is used for this purpose. As the desired field-of-view (FOV) of the system increases, such a conventional optical module necessarily becomes larger, heavier, and bulkier, rendering the device impractical, even for moderate performance. These are major drawbacks for all kinds of displays, but especially so for head-mounted applications wherein the systems must necessarily be as light and as compact as possible. The strive for compactness has led to several different complex optical solutions, all of which, on one hand, are still not sufficiently compact for most practical applications, and on the other hand, are difficult to manufacture. Furthermore, the eye-motion-box (EMB) of the optical viewing angles resulting from these designs is usually very small—typically less than 8 mm. Hence, the performance of the optical systems are very sensitive even to small movements relative to the eye of the viewer, and do not allow sufficient pupil motion for convenient reading of a displayed text. In some of these systems it is preferred to have a symmetric system, where the input light is coupled into the substrate at the central part of the substrate.

U.S. Pat. No. 7,643,214, and in particular FIG. 10, discloses a symmetric light guide optical element (LOE). The symmetric LOE is actually two parts of a combiner slice, bonded together as shown herein in FIG. 1. The bonded slice combiners, with or without the isolation layers, forms the symmetric LOE final configuration, which consists of any number of internal BS coated facets and external mirror coatings, and a bonded surface between both parts as shown in FIG. 2. There are two main problems in this structure. First, the bonded surfaces cause optical interferences such as overlap and underlap of light rays projected through the bonded interface, reflected as white/black stripes in the clear aperture area. Second, both parts must have perfect match to begin with and to be aligned actively to one another before bonding. This process is not robust enough in mass production terms since a sensitive individual handling is involved.

General Description

According to one aspect of the presently disclosed subject matter there is provided a method of fabricating a symmetric light guide optical element ("LOE") having a pair of parallel external surfaces, a first plurality of internal reflective surfaces, and a second plurality of internal reflective surfaces, the first and second plurality of internal reflective surfaces being non-parallel to one another and non-parallel to the pair of external surfaces, including: providing a plurality of transparent plates, each plate having two parallel surfaces; stacking a first subset of the plurality of plates on a transparent base block to form a first stack of plates on the base block, the first stack of plates including an at least partially reflective coating between each pair of adjacent plates; forming a sloped surface on one side of the first stack plates and the base block, the sloped surface being non-perpendicular to the parallel surfaces of the plates in the first stack of plates and including at least a part of the base block; stacking a second subset of the plurality of plates on the sloped surface to form a second stack of plates on the base block, the second stack of plates including an at least partially reflective coating between each pair of adjacent plates, wherein an interface between the base block and the first stack of plates and an interface between the base block and the second stack of plates each include an at least partially reflective coating; and extracting a slice of the first stack, the base block, and the second stack, such that the slice includes at least a part of the base block interposed between plates of the first stack and plates of the second stack.

According to some aspects, stacking the first subset of plates on the transparent base block includes the steps of: applying an at least partially reflective coating between adjacent plates in the first stack and between the first stack and the base block; bonding the plates in the first stack to one another using a permanent adhesive; and bonding the first stack of plates to the base block using a permanent adhesive.

According to some aspects, stacking the first subset of plates on the transparent base block includes the steps of: applying an at least partially reflective coating between adjacent plates in the first stack; bonding the plates in the first stack to one another using a permanent adhesive; and bonding the first stack of plates to the base block using a temporary adhesive, wherein after formation of the sloped surface the first stack of plates is de-bonded from the base block, and re-bonded to the base block using a permanent adhesive after application of an at least partially reflective coating to an interface between the first stack of plates and the base block.

According to some aspects, the method further includes one or more of shaping, lapping and double side polishing the slice to form at least one symmetric LOE.

According to some embodiments, further includes cutting the slice into a plurality of pieces to form a plurality of symmetric LOEs.

According to another aspect of the presently disclosed subject matter there is provided a light guide optical element (LOE) having a pair of parallel external surfaces, a first plurality of internal reflective surfaces, and a second plurality of internal reflective surfaces, the first and second plurality of internal reflective surfaces being non-parallel to one another and non-parallel to the pair of external surfaces, the LOE made by a process include providing a plurality of transparent plates, each plate having two parallel surfaces; stacking a first subset of the plurality of plates on a transparent base block to form a first stack of plates on the base block, the first stack of plates including an at least partially reflective coating between each pair of adjacent plates; forming a sloped surface on one side of the first stack plates and the base block, the sloped surface being non-perpendicular to the parallel surfaces of the plates in the first stack of plates and including at least a part of the base block; stacking a second subset of the plurality of plates on the sloped surface to form a second stack of plates on the base block, the second stack of plates including an at least partially reflective coating between each pair of adjacent plates, wherein an interface between the base block and the first stack of plates and an interface between the base block and the second stack of plates each include an at least partially reflective coating; and extracting a slice of the first stack, the base block, and the second stack, such that the slice includes at least a part of the base block interposed between plates of the first stack and plates of the second stack.

According to another aspect of the presently disclosed subject matter there is provided a light guide optical element (LOE) including: a block of transparent material having a pair of parallel external surfaces configured to propagate light therebetween by total internal reflection; a first set of at least partially reflective mutually parallel internal surfaces within the block that are oblique to the pair of external surfaces, the first set of internal surfaces including a coupling-in surface and at least one coupling-out surface configured to reflect out a first part of the light propagating between the external surfaces of the LOE; and a second set of at least partially reflective mutually parallel internal surfaces within the block that are oblique to the pair of external surfaces, the second set of internal surfaces including a coupling-in surface and at least one coupling-out surface configured to reflect out a second part of the light propagating between the external surfaces of the LOE, wherein the coupling-in surface of the first set of internal surfaces and the coupling-in surface of the second set of internal surfaces together define a chevron-shaped coupling-in reflector, and wherein a part of the block of transparent material lying between the coupling-in surface of the first set of internal surfaces and the coupling-in surface of the second set of internal surfaces is a unitary piece of transparent material without seams.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, and components have not been described in detail so as not to obscure the presently disclosed subject matter.

Figure 1A:
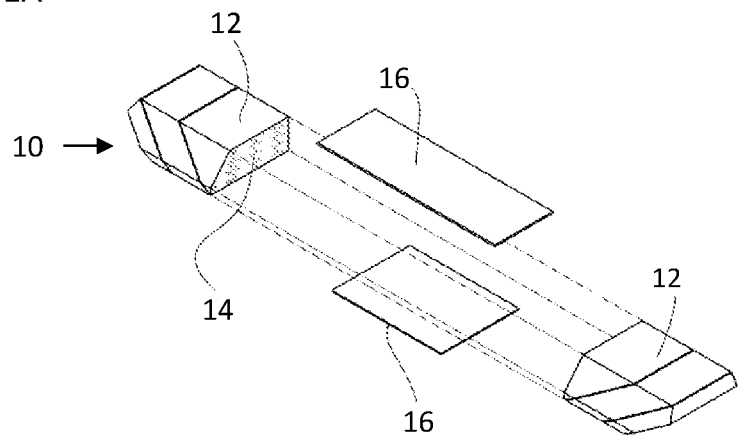
FIG. 1A illustrates an exploded isometric view of a symmetric LOE with a bonding interface between combiner slices.

Bearing this in mind, FIG. 1A illustrates an exploded isometric view of a known embodiment of a symmetric LOE 10 which is actually composed of two parts of a combiner slice 12 which are bonded together with an adhesive bonding surface 14. Optionally, LOE 10 can include top and bottom isolation layer coatings 16.

Figure 1B:
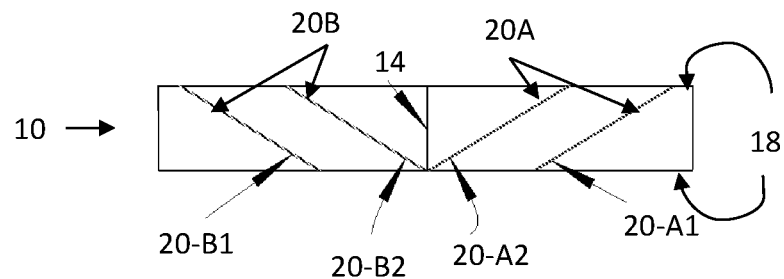
FIG. 1B illustrates a cross-sectional view of a symmetric LOE with a bonding interface between combiner slices.

FIG. 1B illustrates a cross-sectional view of the known symmetric LOE 10 shown in FIG. 1A. The LOE includes a block of transparent material having a pair of parallel external surfaces 18 configured to propagate light therebetween by total internal reflection. LOE 10 further includes a first set 20A of at least partially reflective mutually parallel internal surfaces ("facets") 20 within the block that are oblique to the pair of external surfaces 18. The first set 20A of internal surfaces includes a coupling-in surface 20-A2 and at least one coupling-out surface 20-A1 configured to reflect out a first part of the light propagating between the external surfaces 18 of LOE 10.

LOE 10 further includes a second set 20B of at least partially reflective mutually parallel internal surfaces 20 within the block that are oblique to the pair of external surfaces 18. Like the first set, the second set 20B of internal surfaces includes a coupling-in surface 20-B2 and at least one coupling-out surface 20-B1 configured to reflect out a second part of the light propagating between the external surfaces 18 of LOE 10.

In LOE 10, the first set 20A and second set 20B of facets are non-parallel with respect to one another, and the coupling-in surface 20-A2 of the first set 20A and the coupling-in surface 20-B2 of the second set 20B of internal surfaces together define a chevron-shaped coupling-in reflector.

The internal surfaces 20 are formed by bonding a plurality of transparent plates, and the at least partially reflective property of the internal surfaces are achieved by applying an at least partially reflecting coating between each pair of adjacent plates.

As described above and in U.S. Pat. No. 7,643,214, LOE 10 is fabricated by joining two combiner slices such that a seam (i.e. bonding interface) 14 exists between coupling in surface 20-A2 and coupling in surface 20-B2.

Figure 2:
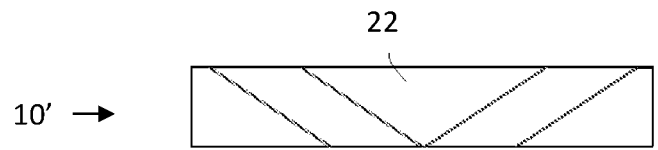
FIG. 2 illustrates a cross-sectional view of a symmetric LOE without a bonding interface.

However, as discussed above, in some applications of near-eye displays it may be beneficial or desirable for enhanced image quality to use a symmetric LOE in which there is no bonding interface between combiner slices, as shown in FIG. 2 illustrating a cross-sectional view of an embodiment of a symmetric LOE 10' without a bonding interface. LOE 10' is similar to LOE 10 except that the block of transparent material lying between the coupling-in surface of the first set of internal surfaces and the coupling-in surface of the second set of internal surfaces is a unitary piece 22 of a transparent material without seams.

Figure 3:
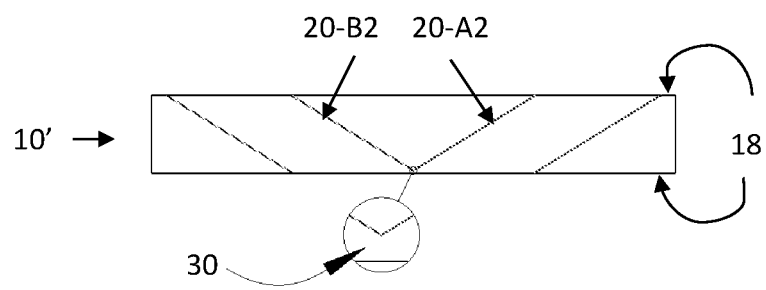
FIG. 3 illustrates a cross-sectional view of a "clean corner" embodiment of a symmetric LOE.

It should be noted that due to manufacturing process constraints, and particularly in the final stages in which the major external surfaces of the LOE are polished for accurate parallelism, there may be a gap 30 between the point at which the coupling-in surface 20A-2 and the coupling-in surface 20-B2 intersect and nearest surface 18 of the LOE, as shown in FIG. 3. A tolerance of about 0-0.1 mm is considered acceptable for such a gap, while more than 0.1 mm should be avoided as likely to cause image degradation.

Figure 4:
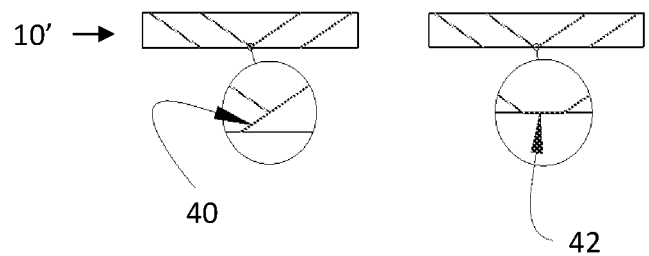
FIG. 4 illustrates cross-sectional views of "degenerated" embodiments of a symmetric LOE.

In some embodiments, there is a need for the area of gap 30 to be "clean" in the sense of an absence of any partially reflective internal surface. This embodiment is shown in FIG. 3 and is referred to herein as a "clean corner" configuration. In other embodiments, as shown in FIG. 4, it may acceptable for a part of at least one coupling-in surface to extend through the area of gap 30 to external surface 18, resulting in an overlap 40 or underlap 42 of the two coupling-in surfaces, as shown in FIG. 4. This embodiment is referred to herein as a "degenerated" configuration.

Figure 5A:
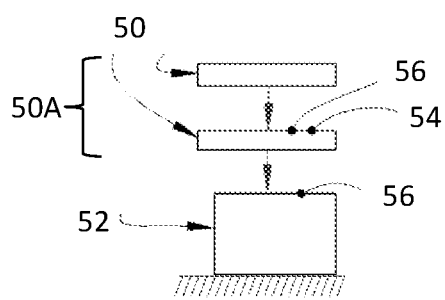
FIGS. 5A-5B illustrate the step of stacking plates on a base block according to embodiments disclosed herein.
Figure 5B:
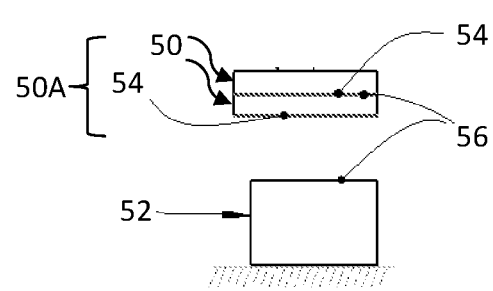

Having described a symmetric LOE 10' without a seam, a method of fabricating LOE 10' according to some embodiments will now be described with reference to FIGS. 5-13. Referring now to FIGS. 5A-5B, initially there is provided a plurality of transparent plates 50, each plate having a pair of parallel surfaces. As shown in FIGS. 5A-5B, the method includes stacking a first subset of the transparent plates 50 on a transparent base block 52 to form a first stack 50A of plates on base block 22. "Stacking" as used herein includes stacking plates one by one onto the base block, or stacking a pre-formed stack of plates onto the base block, or any combination of the above.

Stacking plates to form the first stack 50A preferably includes applying an at least partially reflective coating 54 between each pair of adjacent plates 50, an in addition, in some embodiments preferably includes applying an at least partially reflective coating 54 between the first stack of plates and the base block 52. The at least partially reflective coating 54 applied between adjacent plates may be the same or different at least partially reflective coatings, and the at least partially reflective coating applied between the stack and the base block may be the same or different coating as compared to the coating applied between the plates of the stack. In some embodiments, at least one of the at least partially reflective coatings applied between adjacent plates or between the stack of plates and the base block may be a fully reflective coating.

Stacking plates to form the first stack 50A preferably further includes applying an adhesive coating 56 between adjacent plates in the first stack 50A and between the first stack 50A and the base block 52. The adhesive coating applied between adjacent plates may be the same or different than the adhesive coating applied between the stack of plates and the base block. For example, the plates in the first stack 50A are preferably bonded together with a permanent adhesive, while the first stack 50A may be bonded to the base block 52 using either a temporary adhesive or a permanent adhesive depending on the desired final LOE configuration. For example, to fabricate a "clean corner" symmetric LOE, the first stack 50A of plates should preferably be bonded to the base block 52 at this stage with a temporary adhesive only, while the "degenerated" LOE is preferably fabricated with the first stack 50A of plates bonded now to the base block 52 with a permanent adhesive. Therefore, at this stage, the interface between the base block 52 and the first stack 50A of plates may include the adhesive coating 56 only, as shown in FIG. 5A (e.g. as in the case of the clean corner configuration), or alternatively may include the partially reflective coating 54 as shown in FIG. 5B (e.g. as in the case of degenerated configuration).

Therefore depending on the desired LOE configuration, stacking the first subset of plates may in some cases further include the steps of: i) applying an at least partially reflective coating 54 between adjacent plates in the first stack 50A and between the first stack 50A and the base block 52; ii) bonding the plates in the first stack 50A to one another using a permanent adhesive; and iii) bonding the first stack 50A of plates to the base block 52 using a permanent adhesive.

In other cases, stacking the first subset of plates may include the steps of: i) applying an at least partially reflective coating 54 between adjacent plates in the first stack 50A; ii) bonding the plates in the first stack 50A to one another using a permanent adhesive; and iii) bonding the first stack 50A of plates to the base block 52 using a temporary adhesive. In this embodiment, a temporary adhesive is used between the first stack 50A of plates and the base block 52 to facilitate temporary removal of the first stack 50A and subsequent re-bonding, as will be described below with reference to FIG. 7.

Figure 6:
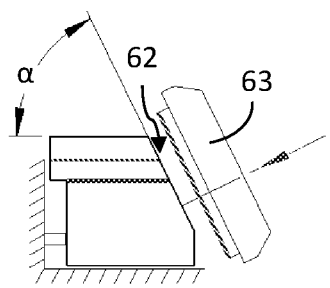
FIG. 6 illustrates the step of forming a sloped surface according to embodiments disclosed herein.

Next, as shown in FIG. 6, a sloped surface 62 (non-perpendicular to the parallel surfaces of the plates) is formed on one side of the first stack 50A of plates and the base block 52, such that the sloped surface includes at least a part of the base block. The sloped surface can be formed by any method known in the art, such as grinding by a grinding apparatus 63, cutting, etc. The angle $\alpha$ between the sloped surface 62 and the parallel surfaces of the plates should correspond to the desired facet angle relative to the external surfaces of the LOE.

Figure 7:
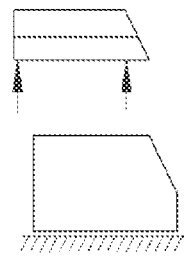
FIG. 7 illustrates the step of removing plates from the base blocks according to embodiments disclosed herein.
Figure 8:
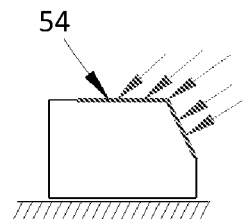
FIG. 8 illustrates the step of coating the base block according to embodiments disclosed herein.

In some embodiments, such as in fabrication of the "clean corner" LOE, after formation of the sloped surface, the first stack 50A of plates is de-bonded from the base block 52 and temporarily removed, as shown in FIG. 7, and an at least partially reflective coating 54 is applied between the first stack 50A and the base block 52 and preferably also applied to the sloped surface part of the base block, as shown in FIG. 8. The first stack 50A is subsequently re-bonded to the base block 52 using a permanent adhesive.

In other embodiments, such as in fabrication of the "degenerated" LOE, the interface between the base block and the first stack 50A of plates may already include the at least partially reflective coating 54 (as shown in FIG. 5B), thus obviating the need for removing the first stack 50A of plates at this stage to coat the base block. In this case, an at least partially reflective coating 54 is applied now only to the sloped surface part of the base block.

Figure 9:
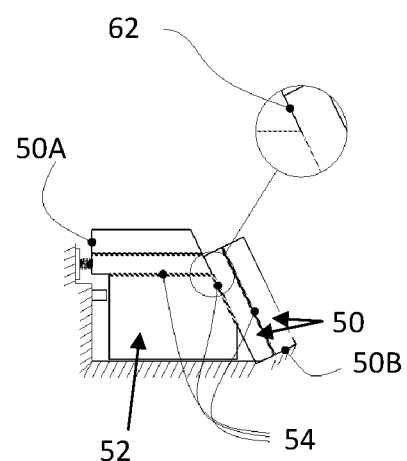
FIG. 9 illustrates the step of forming a second stack according to embodiments disclosed herein.

As shown in FIG. 9, the method further includes stacking a second subset of the plurality of plates 50 on the sloped surface 62 to form a second stack 50B of plates on the base block 52. The second stack 50B of plates includes an at least partially reflective coating 54 between each pair of adjacent plates. In addition, as described above with reference to FIG. 8, the interface between the base block 52 and the second stack 50B of plates also includes an at least partially reflective coating 54. Preferably, the second stack of plates includes an adhesive coating 56 between each pair of adjacent plates and between the second stack and the base block. Preferably, the adhesive is a permanent adhesive.

In the case that the first stack 50A was temporarily removed from the base block 52, the first stack 50A is most preferably re-bonded to the base block during, or subsequent to, the bonding of the second stack 50B to the sloped surface part of the base block 52 such that the first stack is wedged between the base block and the second stack, as shown in FIG. 9.

Figure 10:
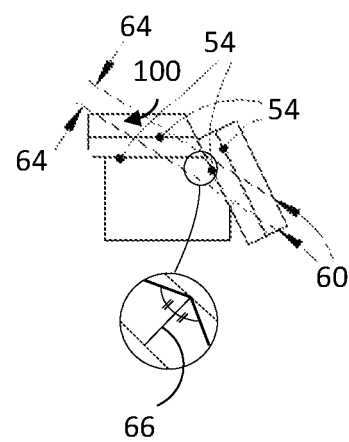
FIG. 10 illustrates the step of extracting a slice of the second stack according to embodiments disclosed herein.

As shown in FIG. 10, the method further includes extracting a slice 100 of the first stack 50A, the base block 52, and the second stack 50B, such that the slice 100 includes at least a part of the base block 52 interposed between plates of the first stack 50A and plates of the second stack 50B. The slice can be extracted using any method known in the art, such as by cutting along parallel lines (shown as dashed lines 60 in FIG. 10) or by grinding (e.g. by applying a grinding force to the first stack, the base block, and the second stack in directions marked by arrows 64 in FIG. 10). The width of the slice should substantially correspond to the desired distance between the parallel external surfaces 18 of the LOE. The cutting out or grinding out of the slice is preferably performed so that the extracted slice has two sets of internal surfaces (where adjacent plates meet) that are substantially symmetrical about an imaginary line 66 extending along a width of the slice at the mid-point of the base block element, as shown in FIG. 10. The inner-most internal surfaces correspond to the coupling-in surfaces of LOE 10'. Preferably, the extraction of slice 100 should be aided with an autocollimator and alignment device, or any known active alignment method and tools, to determine the correct angle between the cutting or grinding tool and the facets of LOE 10'.

Figure 11:
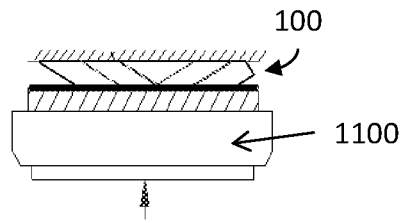
FIG. 11 illustrates the step of lapping a surface of the slice according to embodiments disclosed herein.

As shown in FIG. 11, in some embodiments the method further includes lapping (e.g. using a lapping apparatus 1100) the external surface of slice 100 nearest to the point of intersection between the two coupling-in surfaces such that the external surface is within 0.1 mm of the interface, as described above with reference to FIG. 3 ("clean corner" configuration) and FIG. 4 (overlap-type "degenerated" configuration).

Figure 12:
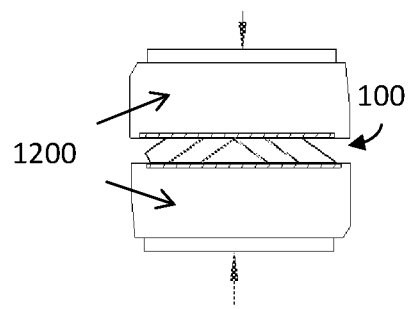
FIG. 12 illustrates the step of double side polishing the slice according to embodiments disclosed herein.

As shown in FIG. 12, in some embodiments, the method further includes polishing slice 100 along the major external surfaces thereof, e.g. using a double side polishing 1200 apparatus, in order to achieve a sufficient degree of parallelism therebetween. The major external surfaces of slice 100 correspond to external surfaces 18 of LOE 10'.

Figure 13:
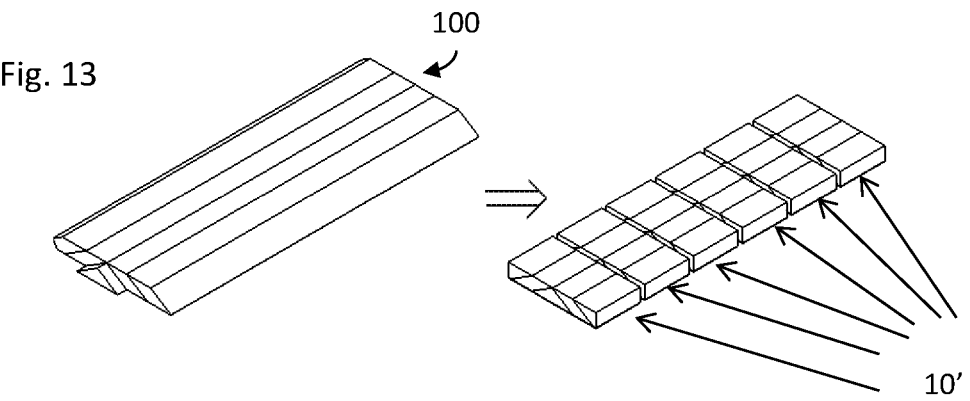
FIG. 13 illustrates the step of shaping and cutting the slice according to embodiments disclosed herein.

As shown in FIG. 13, in some embodiments the method further includes shaping out the slice 100 so that the sides thereof correspond to the desired LOE shape. In some embodiments, the slice 100 then forms a single complete symmetric LOE 10' that is similar to the known symmetric LOE 10 of FIGS. 1A-1B but without a seam between combiner slices. In other embodiments, slice 100 may be cut into a plurality of symmetric LOEs 10', each one of which is similar to the known symmetric LOE 10 but without a seam between combiner slices.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

The invention claimed is:

1. A method of fabricating a symmetric light guide optical element ("LOE") having a pair of parallel external surfaces, a first plurality of internal reflective surfaces, and a second plurality of internal reflective surfaces, the first and second plurality of internal reflective surfaces being non-parallel to one another and non-parallel to the pair of external surfaces, comprising:
   providing a plurality of transparent plates, each plate having two parallel surfaces;
   stacking a first subset of the plurality of plates on a transparent base block to form a first stack of plates on the base block, the first stack of plates including an at least partially reflective coating between each pair of adjacent plates;
   forming a sloped surface on one side of the first stack plates and the base block, the sloped surface being non-perpendicular to said parallel surfaces of the plates in the first stack of plates and including at least a part of the base block;
   stacking a second subset of the plurality of plates on said sloped surface to form a second stack of plates on the base block, the second stack of plates including an at least partially reflective coating between each pair of adjacent plates, wherein an interface between the base block and the first stack of plates and an interface between the base block and the second stack of plates each include an at least partially reflective coating; and
   extracting a slice of the first stack, the base block, and the second stack, such that the slice includes at least a part of the base block interposed between plates of the first stack and plates of the second stack.

2. The method of claim 1, wherein stacking the first subset of plates on the transparent base block includes the steps of:
   applying an at least partially reflective coating between adjacent plates in the first stack and between the first stack and the base block;
   bonding the plates in the first stack to one another using a permanent adhesive; and
   bonding the first stack of plates to the base block using a permanent adhesive.

3. The method of claim 1, wherein stacking the first subset of plates on the transparent base block includes the steps of:
   applying an at least partially reflective coating between adjacent plates in the first stack;
   bonding the plates in the first stack to one another using a permanent adhesive; and
   bonding the first stack of plates to the base block using a temporary adhesive, wherein after formation of the sloped surface the first stack of plates is de-bonded from the base block, and re-bonded to the base block using a permanent adhesive after application of an at least partially reflective coating to an interface between the first stack of plates and the base block.

4. The method of claim 1, further comprising one or more of shaping, lapping and double side polishing the slice to form at least one symmetric LOE.

5. The method of claim 4, further comprising cutting the slice into a plurality of pieces to form a plurality of symmetric LOEs.

6. A light guide optical element (LOE) made by the process of claim 1.

* * * * *